United States Patent
Ronayne, Jr. et al.

(10) Patent No.: US 11,842,593 B2
(45) Date of Patent: Dec. 12, 2023

(54) SYSTEMS AND METHODS FOR DETECTION OF COUNTERFEIT DOCUMENTS

(71) Applicant: IDEMIA National Security Solutions LLC, Alexandria, VA (US)

(72) Inventors: Michael E. Ronayne, Jr., Manassas, VA (US); Mark Burge, Fairfax, VA (US); Jason Hicks, Lorton, VA (US)

(73) Assignee: IDEMIA National Security Solutions LLC, Alexandria, VA (US)

( * ) Notice: Subject to any disclaimer, the term of this patent is extended or adjusted under 35 U.S.C. 154(b) by 403 days.

(21) Appl. No.: 16/817,072

(22) Filed: Mar. 12, 2020

(65) Prior Publication Data
US 2020/0294342 A1 Sep. 17, 2020

Related U.S. Application Data

(60) Provisional application No. 62/818,304, filed on Mar. 14, 2019.

(51) Int. Cl.
*G07D 7/162* (2016.01)
*G06T 7/62* (2017.01)
(Continued)

(52) U.S. Cl.
CPC ......... *G07D 7/162* (2013.01); *G06Q 30/0185* (2013.01); *G06Q 30/0629* (2013.01);
(Continued)

(58) Field of Classification Search
CPC .. G07D 7/162; G07D 7/0055; G07D 2207/00; G06T 7/62; G06T 7/621;
(Continued)

(56) References Cited

U.S. PATENT DOCUMENTS 6,764,000 B1 * 7/2004 Graham ................. G07D 11/30
235/379
10,949,852 B1 * 3/2021 Kramme ............ G06Q 30/0225
(Continued)

FOREIGN PATENT DOCUMENTS

CN 108447169 A 8/2018

OTHER PUBLICATIONS

Burger et al. (2016). "Edge Detection in Color Images" Chapter 16 In Digital Image Processing. Springer, London, pp. 391-411.
(Continued)

*Primary Examiner* — Daniel A Hess
(74) *Attorney, Agent, or Firm* — MORRISON & FOERSTER LLP

(57) ABSTRACT

A method of detecting a counterfeit item using a contactless scanner includes contactlessly scanning at least a portion of an item to generate a scanned image of the at least a portion of the item, wherein the at least a portion of the item comprises a graphic, identifying elements in the scanned image that correspond to elements in the graphic, measuring the identified elements to generate a plurality of element measurements, determining whether the item is counterfeit based on a comparison between at least one element measurement of the plurality of element measurements and at least one reference element measurement that is associated with an authentic version of the item, and in response to determining that the item is counterfeit, generating an alert indicating a detection of a counterfeit item.

23 Claims, 9 Drawing Sheets

(51) Int. Cl.
    *G07D 7/005*          (2016.01)
    *G06Q 30/018*        (2023.01)
    *G06Q 30/0601*      (2023.01)

(52) U.S. Cl.
    CPC .............. *G06T 7/62* (2017.01); *G07D 7/0055* (2017.05); *G06T 2207/30176* (2013.01); *G07D 2207/00* (2013.01)

(58) Field of Classification Search
    CPC ...... G06T 2207/30176; G06Q 30/0185; G06Q 30/0629
    USPC ........................................................ 382/135
    See application file for complete search history.

(56) References Cited

U.S. PATENT DOCUMENTS

| | | |
|---|---|---|
| 2004/0035936 A1 | 2/2004 | Hoson et al. |
| 2008/0041941 A1* | 2/2008 | Talwerdi .............. G07D 7/1205 235/382 |
| 2015/0302421 A1 | 10/2015 | Caton et al. |
| 2016/0182239 A1* | 6/2016 | Terborg Del Rosal ...................... H04N 1/32304 713/175 |
| 2017/0193727 A1 | 7/2017 | Van Horn et al. |
| 2018/0053377 A1 | 2/2018 | Shigeta |
| 2018/0126769 A1 | 5/2018 | Rodriguez et al. |
| 2018/0165906 A1 | 6/2018 | Phillips |
| 2018/0264868 A1 | 9/2018 | Okada et al. |

OTHER PUBLICATIONS

Burger et al. (2016). "Edges and Contours" Chapter 6 In Digital Image Processing. Springer, London, pp. 121-146.
International Search Report and Written Opinion dated Jun. 18, 2020, directed to International Application No. PCT/US2020/022365; 13 pages.

* cited by examiner

SYSTEMS AND METHODS FOR DETECTION OF COUNTERFEIT DOCUMENTS

CROSS REFERENCE TO RELATED APPLICATIONS

This application claims the benefit of U.S. Provisional Application No. 62/818,304, filed Mar. 14, 2019, the entire contents of which are incorporated herein by reference.

FIELD OF THE INVENTION

This disclosure relates generally to counterfeit detection, and more specifically to the detection of counterfeit documents such as bank notes, identity documents, stamp, passports, event tickets, and brand protections.

BACKGROUND OF THE INVENTION

The circulation of counterfeit documents poses a serious threat to economies, consumers, and nations. It fuels the underground economy and finances the activities of terrorists and organized criminal networks. Counterfeit bank notes erode the value of bank notes and have an even greater impact on the consumer through inflation and through monetary losses to individuals and companies.

Many documents include security features to make counterfeiting more difficult. Security features typically fall into three levels. Level 1 security features are easily identified without the need for tools and are designed for detection by casual or public inspectors. Level 2 security features generally require simple tools like magnifying glasses or ultraviolet light to detect. These types of security features are generally targeted at trained inspectors and law enforcement. Level 3 security features are features that require the use of sophisticated equipment to verify their presence. Level 3 features are generally targeted at dedicated inspectors and forensic laboratories Developments in photographic, computer, and printing technologies, and the availability of low-cost equipment, have made the production of counterfeit documents, such as bank notes, relatively simple to produce. With the use of widely available technology, counterfeit documents are made that cannot be easily detected by Level 1 inspection, even if the inspection is performed by trained personnel. While counterfeit document detection systems exist that can detect Level 1, Level 2, and Level 3 security features, these systems are often too costly, intrusive, and/or bulky to be routinely used at common transaction locations, such as point of sale terminals, casinos, and banks.

SUMMARY OF THE INVENTION

According to some embodiments, a counterfeit document detection system scans a document and analyzes elements that form graphics in the document to detect whether the document is genuine or counterfeit. The system can determine whether a document is counterfeit by detecting differences between the elements in the document and corresponding elements in authentic documents. The system identifies elements in graphics in the document, measures features of the identified elements and compares the measurements to reference measurements stored in a database. Upon determining that a document is counterfeit, the system can provide an alert that the document is counterfeit and/or that further inspection should be undertaken.

According to some embodiments, a counterfeit document detection system includes a contactless scanner for quickly and easily scanning documents for counterfeit detection. The contactless scanner can be placed at locations where money changes hands, such as point of sale terminals, casinos, and banks. Personnel can simple pass a document through the contactless scanner without needing to precisely position the document in the scanner, and the scanner can generate a scanned image that accurately captures the elements in graphics in the document. The scanner can transmit scanned images to an image analysis system that measures elements in the scans for counterfeit detection and provides an alert according to whether the document is determined to be genuine or counterfeit.

According to some embodiments, a method of detecting a counterfeit item using a contactless scanner includes contactlessly scanning at least a portion of an item to generate a scanned image of the at least a portion of the item, wherein the at least a portion of the item comprises a graphic, identifying elements in the scanned image that correspond to elements in the graphic, measuring the identified elements to generate a plurality of element measurements, determining whether the item is counterfeit based on a comparison between at least one element measurement of the plurality of element measurements and at least one reference element measurement that is associated with an authentic version of the item, and in response to determining that the item is counterfeit, generating an alert indicating a detection of a counterfeit item.

In any of these embodiments, contactlessly scanning the item can include passing the item into and out of the contactless scanner by hand.

In any of these embodiments, the item can be moved while being scanned.

In any of these embodiments, the scanned image can be transmitted from the contactless scanner to a server for determination of whether the item is counterfeit.

In any of these embodiments, the contactless scanner can generate the alert.

In any of these embodiments, the plurality of element measurements can include at least one of element length, element width, and spacing between elements.

In any of these embodiments, the method can include identifying a type of item by comparing at least some of the plurality of element measurements in the scanned image to sets of element measurements, wherein the sets of element measurements are associated with different types of items.

In any of these embodiments, the at least one element measurement of the plurality of element measurements can be compared to reference element measurements that are associated with the identified type of item.

In any of these embodiments, the plurality of element measurements in the scanned image can include a location of an intersection of a first element with a second element relative to an edge of the item in the scanned image and at least one of a length of the first element, a width of the first element, and a distance between the first element and a third element, and determining whether the item is counterfeit can include locating reference measurements that correspond to the first element in a database of reference measurements of the authentic version of the item based on the location of the intersection of the first element with the second element, and comparing the at least one of a length of the first element, a width of the first element, and a distance between the first element and a third element to the reference measurements that correspond to the first element.

In any of these embodiments, the method may include, in response to determining that the item is counterfeit, comparing at least a portion of the plurality of element measurements to measurements in a database of known counterfeit items to identify a source of the item.

In any of these embodiments, the item can be a bank note.

In any of these embodiments, the item can be an event ticket, an identity document, or a stamp.

According to some embodiments, a system for detecting a counterfeit item includes a contactless scanner for contactlessly scanning at least a portion of a item to generate a scanned image of the at least a portion of the item, wherein the at least a portion of the item comprises a graphic, and at least one processor configured for identifying elements in the scanned image that correspond to elements in the graphic, measuring the identified elements to generate a plurality of element measurements, and determining whether the item is counterfeit based on a comparison between at least one element measurement of the plurality of element measurements and at least one reference element measurement that is associated with an authentic version of the item, wherein the system is configured to generate an alert indicating a detection of a counterfeit item in response to determining that the item is counterfeit.

In any of these embodiments, the contactless scanner and the at least one processor may be connected over a network.

In any of these embodiments, the contactless scanner may include an indicator for providing the alert indicating the detection of a counterfeit item.

In any of these embodiments, the contactless scanner can be configured to contactlessly scan the item while the item is passed into and out of the contactless scanner by hand.

In any of these embodiments, the contactless scanner can be configured to contactlessly scan the item while the item is moving.

In any of these embodiments, the contactless scanner can be configured to transmit the scanned image to a server that comprises the at least one processor for determination of whether the item is counterfeit.

In any of these embodiments, the contactless scanner can be configured to generate the alert.

In any of these embodiments, the plurality of element measurements can include at least one of element length, element width, and spacing between elements.

In any of these embodiments, the at least one processor can be further configured for identifying a type of item by comparing at least some of the plurality of element measurements in the scanned image to sets of element measurements, wherein the sets of element measurements are associated with different types of items.

In any of these embodiments, the at least one processor can be configured so that the at least one element measurement of the plurality of element measurements is compared to reference element measurements that are associated with the identified type of item.

In any of these embodiments, the plurality of element measurements in the scanned image can include a location of an intersection of a first element with a second element relative to an edge of the item in the scanned image and at least one of a length of the first element, a width of the first element, and a distance between the first element and a third element, and the at least one processor can be configured for determining whether the item is counterfeit by locating reference measurements that correspond to the first element in a database of reference measurements of the authentic version of the item based on the location of the intersection of the first element with the second element, and comparing the at least one of a length of the first element, a width of the first element, and a distance o between the first element and a third element to the reference measurements that correspond to the first element.

In any of these embodiments, the at least one processor can be further configured for, in response to determining that the item is counterfeit, comparing at least a portion of the plurality of element measurements to measurements in a database of known counterfeit items to identify a source of the item.

In any of these embodiments, the item can be a bank note.

In any of these embodiments, the item can be an event ticket, an identity document, or a stamp.

BRIEF DESCRIPTION OF THE DRAWINGS

The invention will now be described, by way of example only, with reference to the accompanying drawings, in which.

DETAILED DESCRIPTION OF EXEMPLARY EMBODIMENTS

Figure 1:
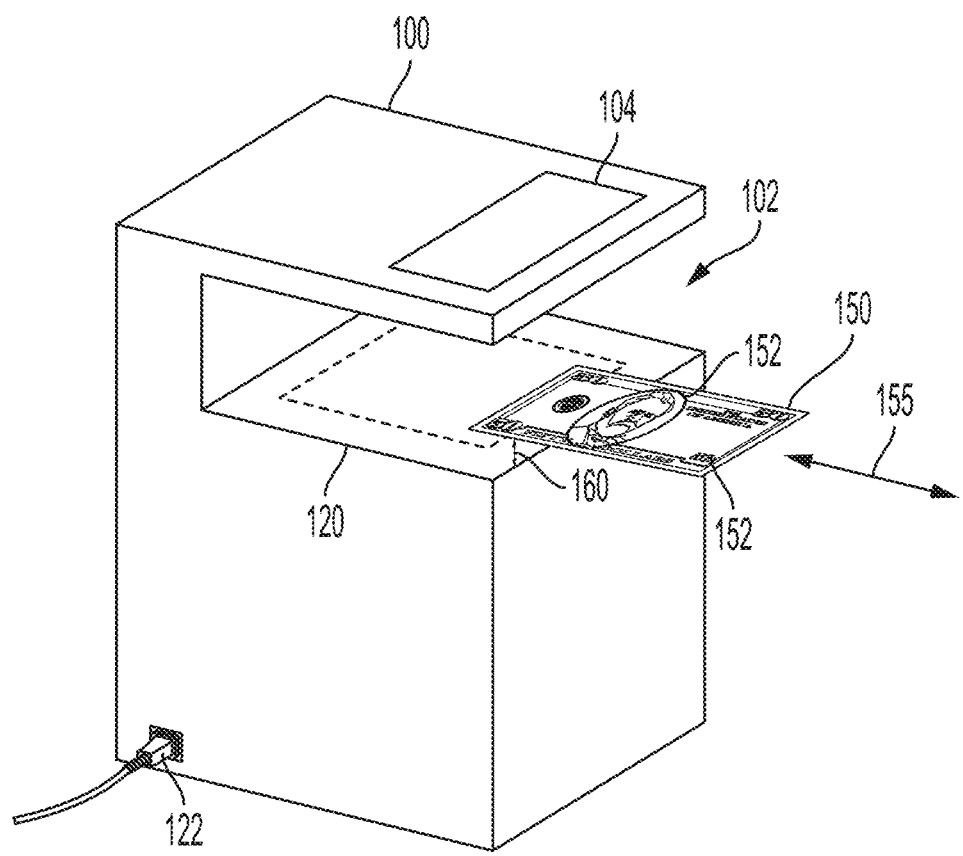
FIG. 1 illustrates a contactless scanner for contactlessly scanning a document for determining whether the document is counterfeit, according to some embodiments.

Described herein are systems and methods that can detect genuine and counterfeit documents, such as bank notes, identity documents, event tickets, and stamps, by scanning the documents, measuring elements in the resulting scanned images, and comparing the element measurements to reference measurements from authentic documents. According to some embodiments, systems and methods use techniques similar to fingerprint analysis to analyze elements that make up graphics in documents. Graphics in authentic documents may be made up of multiple small and tightly spaced elements that may be difficult for counterfeiters to reproduce precisely. Thus, by identifying the elements in the document, measuring aspects of the elements, such as position, size, and shape, and comparing the measurements to measurements from known authentic documents, systems and method according to various embodiments can detect counterfeit documents quickly and accurately.

Many authentic documents, such as bank notes, are produced using intaglio printing methods in which the ink resides above the paper fibers of the document. Intaglio printing uses high precision plates, which ensures that the intaglio elements are uniformly formed from one document to the next. Inexpensive printing equipment that is often used by counterfeiters, such as ink jet, laser, and offset printers, cannot reproduce elements with the same precision as intaglio printing. Ink in elements produced by non-intaglio printing methods often bleeds, resulting in non-uniform elements and increased and or decreased element spacing relative to authentic documents. Thus, systems and methods according to various embodiments analyze the elements in graphics of documents to detect discrepancies between the documents and authentic versions of the documents.

According to various embodiments, scanning of documents for counterfeit detection can be performed using any suitable scanner. As used herein, "scanner" (or "scanning device") means a device that has the capability to detect light reflected off of a surface of a document. A scanner, according the systems and methods described herein, can be a multiple-purpose device capable of generating an image of a document (such as a smartphone or tablet) or can be a dedicated device configured specifically for scanning a document for counterfeit detection.

In some embodiments, the scanner is a contactless scanner. According to various embodiments, a contactless scanner can be any device that can generate a scan of the document without the device having to be placed against a surface of the scanner, including, for example, smartphones, tablets, and any other handheld devices having sufficient imaging and processing capability. According to various embodiments, contactless scanning can include moving the document into a scanning position while the contactless scanner remains fixed in place, moving the scanner into a scanning position while the document remains fixed in place (such as positioning a smartphone above a document placed on a table), and/or moving both the document and the scanner into scanning positions (such as holding a document in one hand and a handheld imaging device in the other hand). According to various embodiments, documents can be scanned using any suitable light wavelength band, including visible light wavelengths (including subsets—e.g., specific colors—of visible light wavelengths), infrared light, ultraviolet light, other wavelengths, and any combination of wavelength bands.

As used herein, a document is any item that is produced by applying features to a substrate. The substrate can be a paper substrate, fabric substrate, plastic substrate, polycarbonate substrate or any other substrate or combination of substrates. Documents according to the principles described herein can include, but are not limited to, bank notes, identification documents, stamps, and event tickets. The application of features to the substrate can be by any suitable method, including but not limited to Letterpress printing, Offset printing, Gravure printing, Flexography printing, Dye-Sublimation printing, Inkjet printing, Laser printing, Pad printing, Relief printing, Screen printing, Intaglio printing, and Thermal printing.

In the following description of the disclosure and embodiments, reference is made to the accompanying drawings, in which are shown, by way of illustration, specific embodiments that can be practiced. It is to be understood that other embodiments and examples can be practiced, and changes can be made without departing from the scope of the disclosure.

In addition, it is also to be understood that the singular forms "a," "an," and "the" used in the following description are intended to include the plural forms as well, unless the context clearly indicates otherwise. It is also to be understood that the term "and/or" as used herein refers to and encompasses any and all possible combinations of one or more of the associated listed items. It is further to be understood that the terms "includes, "including," "comprises," and/or "comprising," when used herein, specify the presence of stated features, integers, steps, operations, elements, components, and/or units but do not preclude the presence or addition of one or more other features, integers, steps, operations, elements, components, units, and/or groups thereof.

Certain aspects of the present disclosure include process steps and instructions described herein in the form of an algorithm. It should be noted that the process steps and instructions of the present invention could be embodied in software, firmware, or hardware and, when embodied in software, could be downloaded to reside on and be operated from different platforms used by a variety of operating systems. Unless specifically stated otherwise as apparent from the following discussion, it is appreciated that, throughout the description, discussions utilizing terms such as "processing," "computing," "calculating," "determining," "displaying," "generating" or the like, refer to the action and processes of a computer system, or similar electronic computing device, that manipulates and transforms data represented as physical (electronic) quantities within the computer system memories or registers or other such information storage, transmission, or display devices.

The present disclosure also relates to a device for performing the operations herein. This device may be specially constructed for the required purposes, or it may comprise a general-purpose computer selectively activated or reconfigured by a computer program stored in the computer. Such a computer program may be stored in a non-transitory, computer readable storage medium, such as, but not limited to, any type of disk, including floppy disks, USB flash drives, external hard drives, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The methods, devices, and systems described herein are not inherently related to any particular computer or other apparatus. Various general-purpose systems may also be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the present invention as described herein.

FIG. 1 illustrates a contactless scanner 100 for contactlessly scanning a document 150, such as a banknote, for determining whether the document 150 is counterfeit. Scanner 100 scans the document 150 and generates a high resolution scanned image of the document that can be analyzed and compared to information about authentic versions of the document to determine whether the document is authentic or counterfeit. In some embodiments, scanner 100 analyzes the scanned image and determines whether the scanned document is counterfeit. In other embodiments, the scanner 100 transmits the scanned image to a separate system that the scanner 100 is communicatively connected to, such as via a communication connection 122, for analysis of the scanned document. In some embodiments, the scanner 100 performs at least some analysis of the scanned image and transmits results of the analysis to a separate system for comparison to information about authentic versions of the document.

Scanner 100 includes a scanning port 102 that allows the document 150 to be passed through the scanner 100 for scanning. A user can manually pass the document 150 through (e.g., into and out of, in one side and then out the opposite side, etc.) the scanning port 102, and the scanner 100 can automatically scan the document and generate a scanned image of the document or a portion of the document. The scanner 100 can be a contactless scanner that is configured to scan the document without the document having to be placed on any surface of the port 102. For example, in the embodiment illustrated, the document 150 is held above the bottom surface 120 of the scanning port 102 by an amount 160, which illustrates that the scanner 100 can scan the document 150 while it is spaced above a surface of the port 102.

The scanner 100 can be configured to rapidly scan the document 150 so that a user can quickly pass the document into and then out of (or through) the scanner 100, as indicated by arrow 155. The scanner 100 can scan the document 150 regardless of how the document 150 is passed through the scanner. For example, arrow 155 illustrates the document 150 passing into and then out of a front of the scanner 100. However, arrow 155 is merely illustrative. The document 150 can be passed in any manner through the scanner 100, including entering on one side and exiting on another side, entering at a corner and exiting at the same corner, at a side, or at another corner. The entire document 150 need not be passed into the scanner. A scan of only a portion of a document 150, such as at least one-tenth, at least one-quarter, at least one-third, or at least one-half may be sufficient for counterfeit detection.

In some embodiments, the scanner 100 can scan the document 150 while the document is moving to make the scanning process easier for the user—i.e., the user does not have to hold the document still in the scanner for the scanner to generate a scan. In some embodiments, the scanner can generate a scan of the document that is suitable for counterfeit detection while the document is moving through the scanner as long as the rate of movement is below a predetermined threshold rate. In some embodiments, the scanner 100 generates a single scanned image of the document. In other embodiments, the scanner 100 generates multiple scanned imaged of the documents.

In some embodiments, scanner 100 includes a user interface 104. In some embodiments, the user interface 104 may indicate to a user whether a document that has been scanned is determined by the scanner 100 or by a system that interfaces with the scanner to be counterfeit. The user interface 104 can be a screen for displaying text and/or graphics or may be a series of lights or other kinds of indicators.

Figure 2:
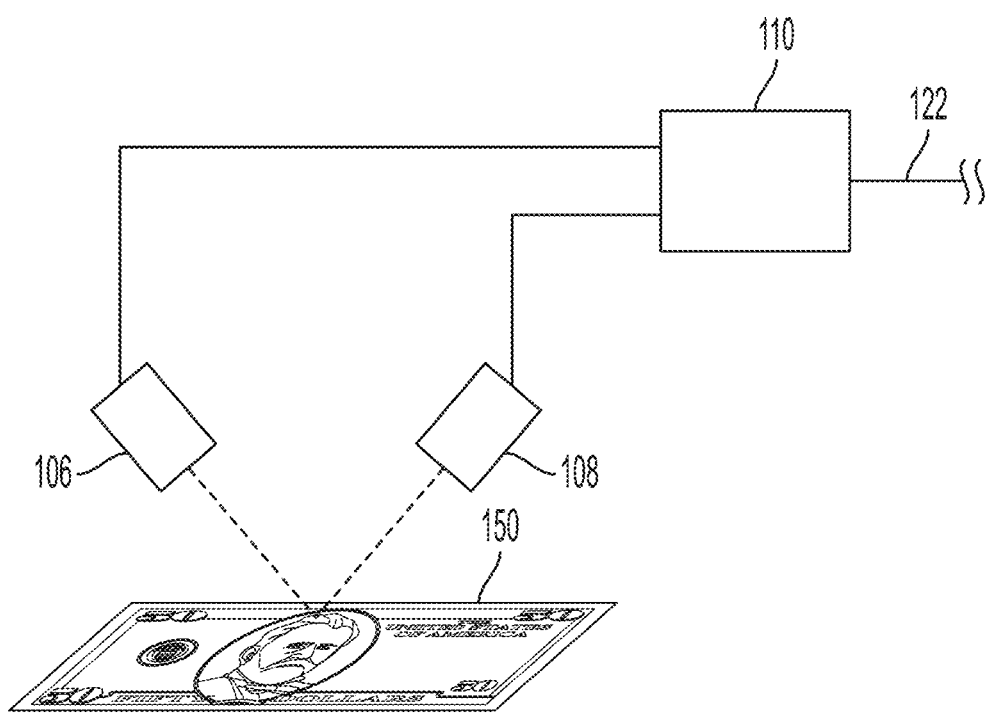
FIG. 2 illustrates imaging components of a scanner, such as the scanner of FIG. 1, according to some embodiments.

FIG. 2 illustrates imaging components of scanner 100, according to some embodiments. Scanner 100 can include one or more light sources 106 for illuminating a document 150 passed into the port 102. One or more imagers 108 detect the light reflected from the document 150. The one or more light sources 106 and the one or more imagers 108 are connected to one or more processors 110 that control the one or more light sources 106 and process signals from the one or more imagers 108 for generating scanned images of documents. The one or more light sources 106 can be any suitable type of light source or combination of types of light sources, such as LEDs. The one or more light sources 106 can include one or more filters for providing illumination of one or more specific wavelengths to the document 150. The one or more imagers 108 can include any suitable imaging sensor, such as a CMOS sensor or CCD sensor. The one or more imagers 108 can include imaging optics, such as lenses and filters, for shaping and/or defining a wavelength band of light reaching an imaging sensor. The one or more light sources 106 and one or more imagers 108 can be positioned below the scanning port 102, above the scanning port 102, or both.

Communication connection 122 can be used to connect the scanner to one or more remote computers, such as via a local network, for transmitting scanned images or data generated from scanned images to the one or more remote computers.

Figure 3A:
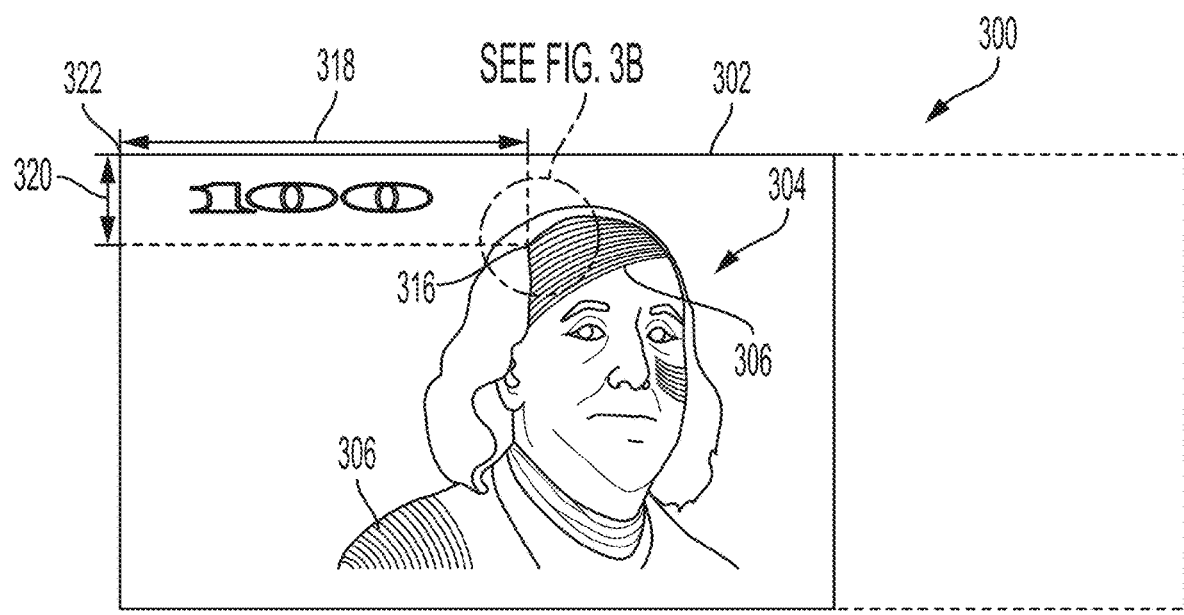
FIG. 3A is a simplified representation of a scanned image generated by scanning a document, according to some embodiments.
Figure 3B:
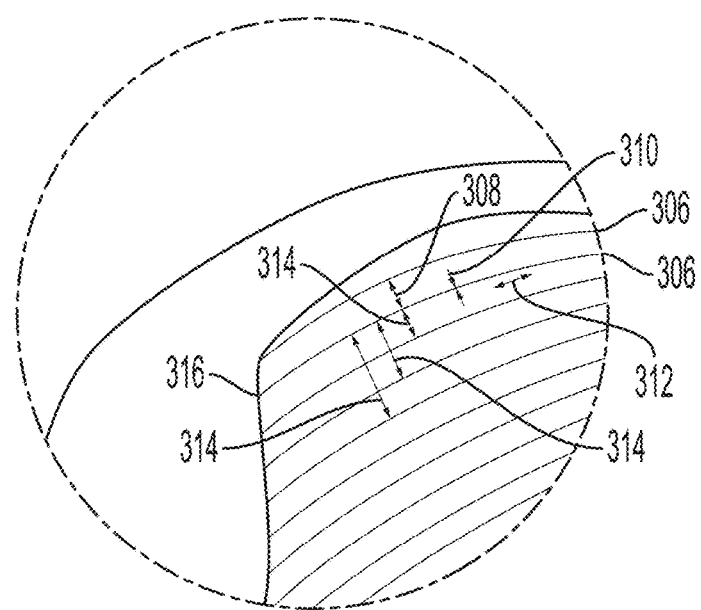
FIG. 3B is an enlarged portion of FIG. 3A.

As stated above, the scanner 100 can scan a document pass through the scanner and generate a scanned image of the document. A document, such as document 150, generally includes one or more graphics 152, as shown in FIG. 1. One or more of the graphics 152 may be comprised of elements that may be used to determine whether the document is counterfeit, as described herein. Examples of graphical elements include ink-based elements, such as inked lines or other shapes, texture-based elements, such as raised or indented areas of various sizes and shapes, material-based elements, such as different materials used in combination, and/or combinations thereof. To illustrate examples of elements that may be detected according to various embodiments, FIGS. 3A and 3B provide a simplified representation of a scanned image 302 generated by scanning a document 300, according to some embodiments. In this example, the document 300 is a banknote that includes a graphic 304. The graphic 304 (a portrait in this example) is at least partially made up of a plurality of elements 306 (only a portion of the elements of the graphic are shown and the size and spacing of the elements is exaggerated for illustration purposes). The scanner 100 can accurately capture the elements that make up one or more graphics in the document (i.e., the elements are not blurred or otherwise distorted) so that measurements of the elements from the scanned image are accurate and can be reliably compared to measurements of the same features of a known authentic version of the document that are stored in a database. Accordingly, the systems and methods described herein can measure various aspects of the elements in graphics of documents that are captured in scans of the document to determine whether the document is authentic.

Figure 4:
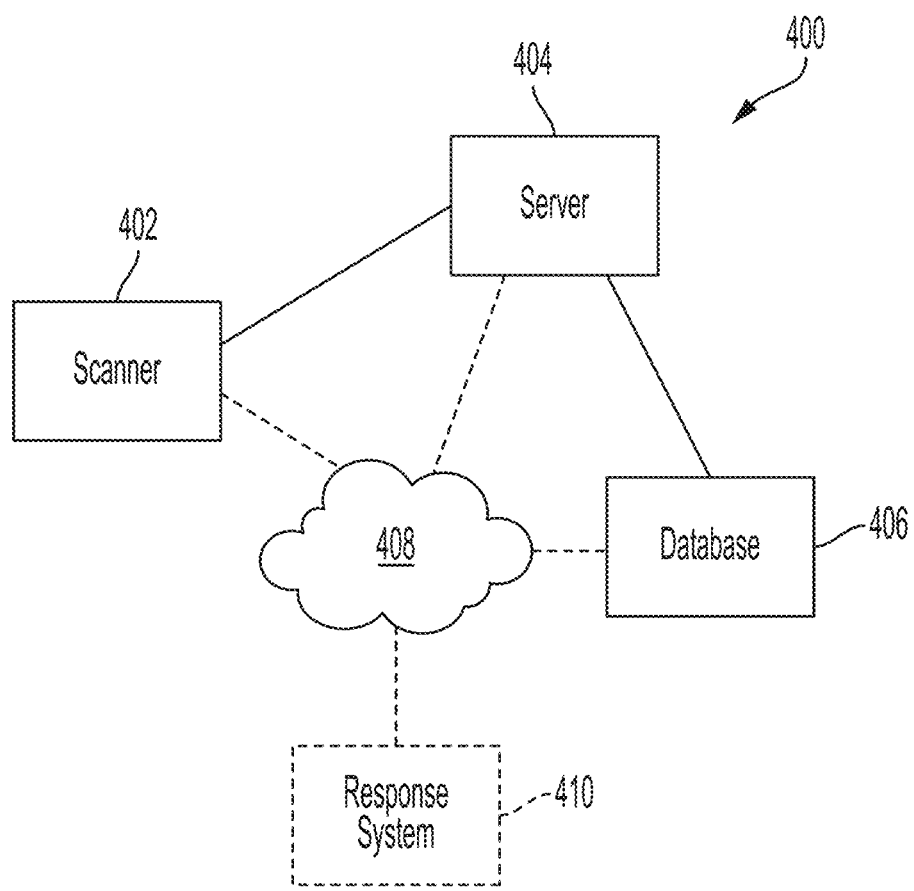
FIG. 4 is a block diagram of a counterfeit detection system, according to some embodiments.

FIG. 4 illustrates a counterfeit detection system 400, according to some embodiments. System 400 includes a scanner 402, such as scanner 100 of FIG. 1, a server 404, and a database 406. The scanner 402 and server 404 are communicatively connected either directly or via one or more communication networks 408. The scanner 402 scans documents and generates one or more scanned images of the documents.

In some embodiments, one or more scanned images generated by the scanner 402 are transmitted from the scanner 402 to the server 404 for analysis and detection of counterfeiting. The server 404 may analyze scanned images received from the scanner 402 to identify elements of the scanned images and characteristics of the elements. The server 404 may compare the characteristics of the identified elements to the characteristics of the corresponding elements associated with authentic document reference data stored in the database 406.

The database 406 may be a local database on the server 404 or may be a remote database that is communicatively connected to the server 404. The reference data stored in database 406 may include data for authentic documents and/or data for known types of counterfeit documents. The server 404 may determine that a scanned image represents a counterfeit document based on differences between the characteristics of the identified elements in the scanned image(s) and reference data for authentic documents that is stored in the database 406 and/or based on similarities between the scanned image(s) and data for known types of counterfeit documents that is stored in the database 406.

The database 406 may store data associated with elements of different types of documents. For example, the database 406 of a system configured for detecting counterfeit banknotes may store data for authentic versions of the different denominations of banknotes, and a database 406 of a system configured for detecting counterfeit identity documents may store data for authentic versions of the different types of identify documents.

In some embodiments, the database 406 stores data for an entire authentic document. For example, the database 406 may store data for characteristics of elements of the entire front and back of a banknote. This can ensure that the element(s) in whatever portion of the document that is scanned has corresponding reference data in the database 406, which may be advantageous in enabling counterfeit detection from only partial scans of the documents. In other embodiments, the database 406 stores data associated with only a portion of a reference document, such as one or more areas having graphics, which may be advantageous in reducing the size of the database 406 and/or the time that it takes to compare scanned image data to the data in the database.

Server 404 may determine whether a scanned image is associated with an authentic document or a counterfeit document and may provide an alert or other type of feedback to the scanner 402. For example, the server 404 may provide a signal to the scanner 402 indicating that the document has been determined to be a counterfeit, and the scanner may display an alert to the user, such as a warning light or a message on a display screen. Conversely, the server 404 may provide a signal indicating that the document is authentic, and the scanner 402 may provide a corresponding indication to the user, such as a green light or an "ok" message.

In some embodiments, server 404 may provide an alert associated with a detection of a counterfeit document to a response system 410. The response system 410 may be a system for providing a secondary check of a scanned image that has been determined to be for a counterfeit document and/or for providing a response to a detection of a counterfeit. For example, response system 410 may be provided in a security office staffed by security personnel who may analyze the scanned image (e.g., displayed on a display screen) to determine whether the determination of the server 404 is correct based on their training and experience. Additionally or alternatively, response system 410 may alert security personnel who then begin closely observing a person that attempted to pass a counterfeit document. For example, security personnel may observe video feeds from cameras at a casino table where a scanned bank note was passed or video feeds from cameras at a teller in a convenience store.

Response system 410 may be incorporated in the same physical system as server 404 or may be remote from server 404. Response system 410 can include a single physical system or can include multiple communicatively coupled systems. For example, response system 410 can include a system in the security office of an establishment and a communicatively connected law enforcement system.

In some embodiments, the features of the server 404 and/or database 406 are incorporated into the scanner 402, so that the scanner 402 is a standalone counterfeit detection system. In some embodiments, multiple scanners 402 are connected to the server 404 and the server performs counterfeit detection for images received from the multiple scanners. For example, scanners can be placed at each point of sale of a retail chain and can be communicatively coupled to one or more central servers that analyze images from the scanners.

Figure 5:
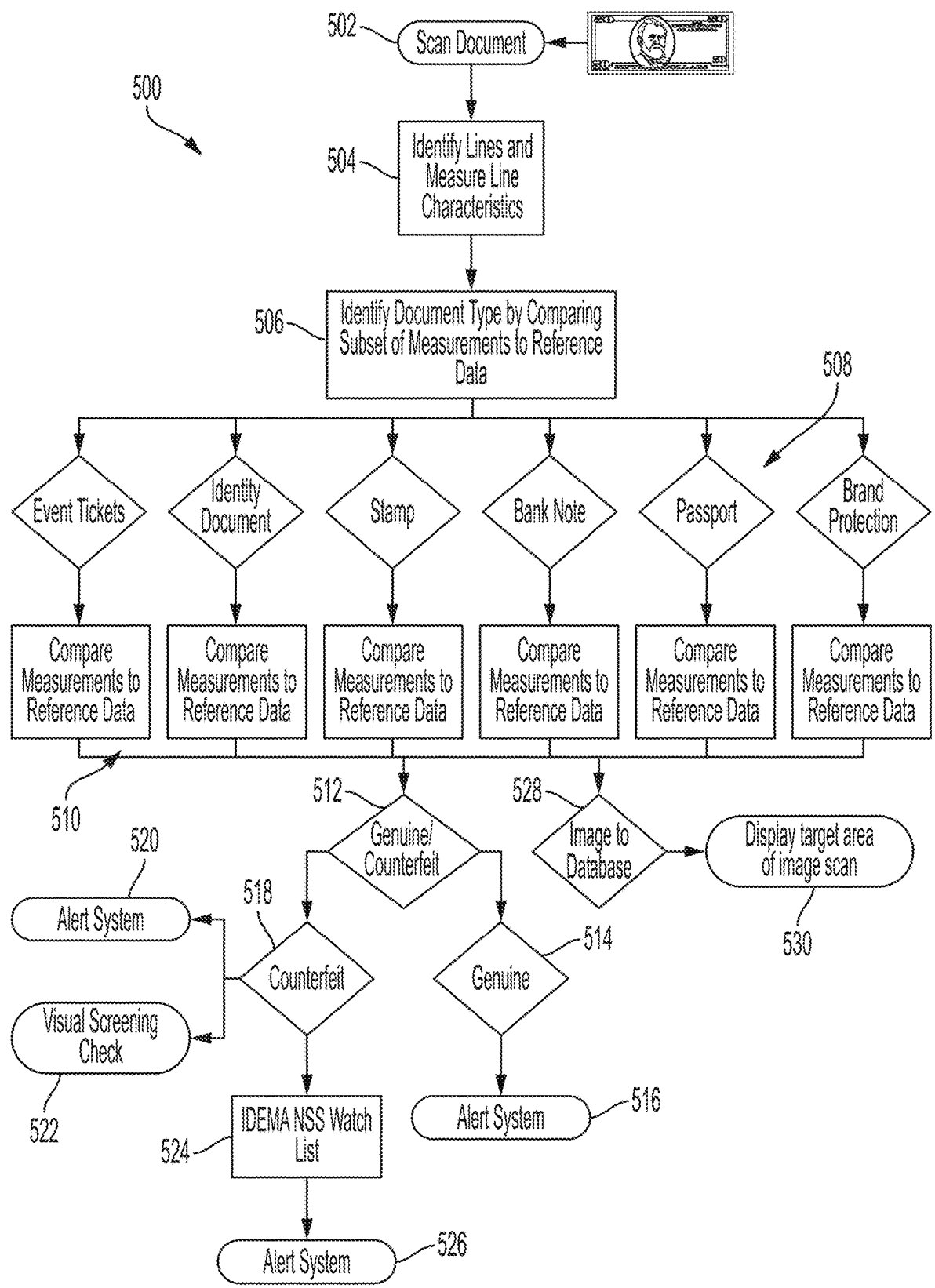
FIG. 5 is a flow diagram of a method for verifying the authenticity of a document, according to some embodiments.

FIG. 5 illustrates a method 500 for verifying the authenticity of a document, such as a bank note, an identity document, an event ticket, or any other document that is formed of elements. Method 500 may be performed, for example, by a system that includes a scanner, such as system 400 of FIG. 4, and may include contactlessly scanning the document and determining whether the document is counterfeit in real time, which can enable counterfeit detection at the time of that the document is passed.

Method 500 includes scanning a document, identifying the type of document, extracting information about elements of the document, comparing the information to reference information about known authentic versions of the document to determine whether the document is counterfeit, and providing an alert regarding the counterfeit determination. Method 500 can be used to determine, quickly and accurately, whether a document is counterfeit to enable a user to accept or rejected a document at the time that the document is presented.

At step 502, a document is passed through and scanned by a scanner, such as scanner 100 of FIG. 1, and one or more scanned images of the document are generated. The entire document may be scanned or only a portion of the document may be scanned. In some embodiments, the front and back of the document is scanned based on a single pass of the document into a scanner that includes imagers above and below the document. In other embodiments, the document is passed through a scanner more than once to generate scans of both sides of the document—i.e., the item is flipped over between scans. In some embodiments, only one side of the document is scanned and the reference data used to determine whether the document is counterfeit includes reference data for both the front and back of authentic documents so that it does not matter which side of the document that is scanned.

In some embodiments, a single scanned image is generated per pass of a document into the scanner. For example, a scanned image may be generated from a single snapshot of the document taken at some point while the document is in the scanner or a scanned image may be generated from multiple snapshots taken over time while the document is in or moving through the scanner. In other embodiments, multiple scanned images are generated per pass of the document into the scanner.

In some embodiments, a scanned image includes a continuous portion of the document, such as, for example, an end half of the document. In other embodiments, a scanned image includes multiple non-continuous portions of the document, such as a corner portion of the document and a center portion of the document.

In some embodiments, scanned images of the same type of item may include different portions of the item. For example, a scanned image generated in response to passing a first bank note through the scanner may be of the front side of the bank note and a scanned image generated in response to passing a second bank note of the same type through the scanner may be of the backside of the bank note. The counterfeit detection of the first bank note may be performed from the scanned image of the front side of the first bank note, whereas the counterfeit detection of the second bank note may be performed from the scanned image of the backside of the second bank note.

In some embodiments, the document is contactlessly scanned by a contactless scanner. Contactlessly scanning means that the document is scanned without the document needing to be positioned on a scanning surface of the scanner. Contactless scanning can be performed more quickly than scanning that requires the document to be placed on a specific location of a surface of a scanner for generation of an accurate scan. As used herein, contactless scanning includes any scanning modality.

In some embodiments, the scanned image (or images) is transmitted to a server that analyzes the scanned image to determine whether the document is counterfeit or authentic in accordance with the steps below. In some embodiments, the same apparatus that scans the document performs one or more of the analysis steps below.

At step 504, the scanned image (or scanned images) is analyzed to identify elements in the scanned image that correspond to elements in the document that was scanned and to measure characteristics of the identified elements. The scanned image may be received by a server that is remote from the scanner, such as server 404 of system 400, and the remote server may perform the analysis function(s) described below. In other embodiments, some or all of the analysis is performed locally by the scanner.

Step 504 includes identifying and measuring elements. Elements can be identified using one or more feature detection algorithms. Examples of types of element that may be identified include but are not limited to corners, lines, geometric shapes, blobs, ridges and valleys, material transitions, colors and/or areas of color, and areas of high or low reflectivity. At step 504 the scanned image (or scanned images) analyzed may be grayscale, color, or multi-channel. In some embodiments, monochromatic filters are applied separately to each color channel, thereby treating the image as a stack of scalar-valued images. In some embodiments, color images are treated as stacks of intensity images so that off-the-shelf detector implementations for grayscale images can be reused without any modification by applying the techniques independently to one or more of the individual color channels. According to various embodiments, elements can be detected using one or more edge detection algorithms that can identify points in a scanned image at which the image brightness changes sharply, which is generally indicative of edges. Since conventional monochromatic detection methods are unable to detect edges between color regions of similar brightness, in some embodiments the detection techniques utilize the additional information available in the color images when locating edges between two image regions of different hues but similar brightness. An element identified in step 504 can be made up of a number of edges. The edges of an element can be detected, and the element can be identified based on the collection of edges that define the element using an edge detection and line following algorithm, such as the color-based 2D vector field approach of Burger and Burge (Burger, Wilhelm and Mark J. Burge. Digital Image Processing: an algorithm introduction. Springer, 2016), which is incorporated herein by reference in its entirety.

Figure 10A:
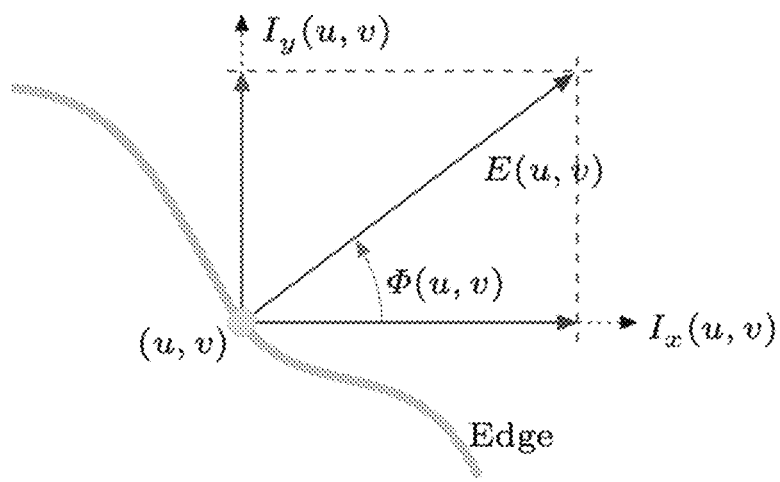
FIGS. 10A and 10B illustrate aspects of edge detection for identifying elements, according to some embodiments.

As illustrated in FIG. 10A, according to some embodiments, edge detection can include computing the local edge strength $E(u, v)$ and orientation $\Phi(u, v)$ at a location $(u, v)$ from the gradient at location u, v using gradient-based edge extraction from a scaled filter such as the Prewitt or Sobel operator. In some embodiments, the edge map is binary and computed by applying a threshold operation to the edge strength delivered by the edge operator using either a fixed or adaptive threshold value. In some embodiments, the edge map is continuous and represents the edge strength for each image position as well as the angle of the local edge's orientation. In some embodiments, the edge map is created by merging the output of a set of relatively large, oriented filters applied as above at multiple image resolutions.

Figure 10B:
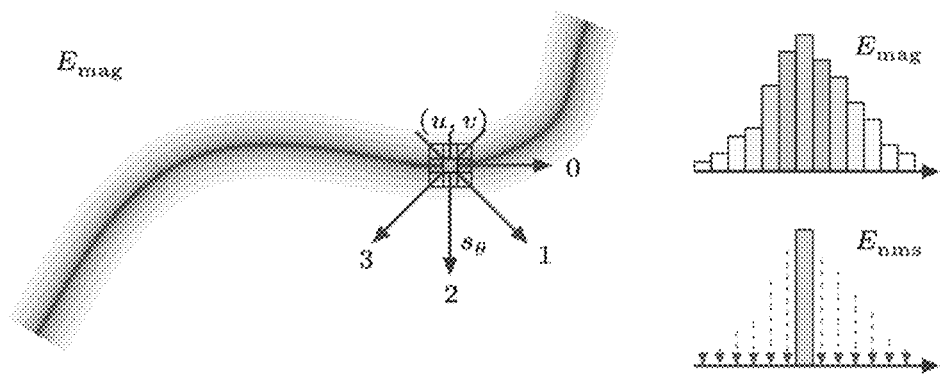

Edge maps with interruptions at positions of insufficient edge strength may contain many small, unconnected contour fragments. In some embodiments, an edge map is further processed with an algorithm with three main goals: (a) to minimize the number of false edge points, (b) achieve good localization of edges, and (c) deliver only a single mark on each edge. An embodiment optimized for these goals may compute the magnitude $E(u, v)$ (shown as Emag) and orientation $\Phi(u, v)$ (shown as S theta) using a Canny approach as illustrated in FIG. 10B, which at a high level, includes: (1) noise reduction by pre-processing with a Gaussian filter; (2) edge isolation by local maxima of gradient magnitude using non-maximum suppression; and (3) edge tracing and hysteresis thresholding to collect sets of connected edge pixels from the local maxima.

In some embodiments, the color images may contain additional multi-channel information collected outside of the visible light ("VL") spectrum. The edge information in this multi-channel data may be ambiguous or contradictory ranging for instance from misalignment of scanning elements or complex cases where multiple edges run in different directions and correspond to different physical marks in the document apparent only at specific wavelengths. Accordingly, in some embodiments, a multi-dimensional color space where local gradients calculated in the detection techniques treat the color image as a 2D vector field is used, which enables processing multi-channel input where some channels are linear and others non-linear responses. In some embodiments, the vector field is obtained from the channels of the input after linearly or non-linear transforms into specific color spaces which enhances the performance of the detection techniques.

In some embodiments, scanners use edges and their orientations from an optical electronic scanner to identify elements. In some embodiments, scanners includes specialized sensors, such as specifically engineered cameras and illuminators, to enable techniques which can include structured light to identify elements.

Once elements are identified, one or more properties (also referred to herein as features or characteristics) of the identified elements can be measured. Examples of properties that can be measured include shape, size, and position relative to other elements and/or relative to a reference point. Properties such as size can be measured using the locations of detected edges. For example, the width or thickness of an element can be measured by determining the distance from one edge to the next edge. As another example, the shape of an element can be measured by determining the curvature of the edge or edges that form the element.

In some embodiments, lines are the type of element or primary type of element that is identified in step 504. Identification of lines may be useful for analyzing documents that includes graphics formed of printed lines. The scanned image generated from a document composed of lines is analyzed to identify lines in the scanned image. The identified lines may then be measured to generate one or more line measurements, such as one or more of length, thickness, distance from other lines, distance from edges, etc., for one or more of the identified lines.

Returning to FIGS. 3A and 3B to illustrate step 504, according to some embodiments, the scanned image 302 is analyzed to identify elements 306 that correspond to elements in a graphic 304 in the document 300. One or more characteristics of the elements 306 are measured. Characteristics of elements that are measured can include element length 312, element thickness 310, spacing 308 between adjacent elements, and spacing 314 from an element to a reference element. In some embodiments, the scanned image is analyzed to identify points of intersection 316 between elements and these intersection points 316 are used to define an endpoint of the elements that intersect thereon. In some embodiments, characteristics of elements can include the spacing between a point of intersection and one or more reference features of the scanned image. For example, the x- and y-distance (318 and 320, respectively) of an intersection point 316 from a reference corner 322 of the scanned image may be used to identify the starting (or ending) point of an element that intersects with other elements at the intersection point 316.

Figure 6:
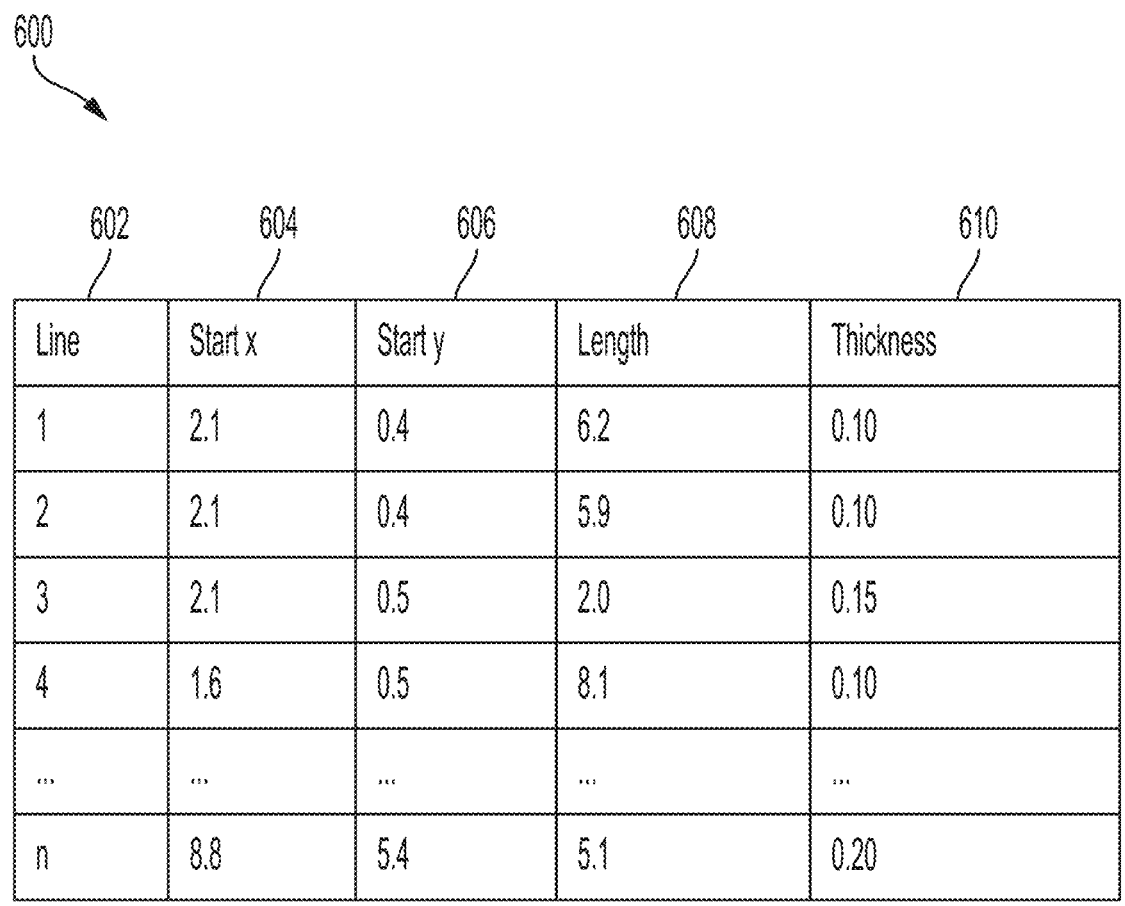
FIG. 6 illustrates an exemplary set of element measurement data that can be generated from a scanned image of a document composed of elements, according to some embodiments.

The result of the analysis at step 504 can include data associated with the characteristics of one or more identified elements in the scanned image. This can include, for example, element location (e.g., based on locations of endpoints), element length, element thickness, and element spacing. FIG. 6 illustrates an exemplary set of data that can be generated in step 504 for a document composed of elements. The dataset 600 includes an element identifier 602, an element start point in the x-dimension 604, an element start point in the y-dimension 606, an element length 608, and an element thickness 610 for each of n elements. In dataset 600, two of the elements include the same start point—element 1 and element 2—as indicated by the same start x- and y-measurements, which indicates that the two elements intersect. The x- and y-measurements for all of the elements may be measured from some landmark in the scanned image.

At step 506, data generated in step 504 is used to identify the type of document that was scanned. Step 506 may be performed by a system that is configured to analyze various types of documents, such as various types of identity documents (e.g., driver's licenses from different states) or various types of bank notes (e.g., different denominations, printing years, and country). In some embodiments, the system is configured for analyzing only one type of document, and therefore, step 506 may be omitted.

Step 506 may include analyzing only a portion of the data generated during step 504 to identify the type of the document. By analyzing only a portion of the data, step 506 may be performed more quickly than in instances in which all of the data is used to identify the type of document. For example, data associated with only the upper left portion of scanned image 302 of FIG. 3 may be analyzed to identify the document as a bank note having a denomination of 100.

Document type identification in step 506 may be performed by comparing characteristics of elements in one or more specific portions of the scanned image to identify characteristics in a reference database, such as database 406 of system 400. For example, the reference database may be searched for data associated with one or more elements in a specific location of the scanned image (e.g., intersection points of one or more elements in the upper left corner of the scanned image) and/or for data associated with a pattern of elements found in a specific location in the scanned image. In some embodiments, the reference database can include a subset of data associated with each type of document, which can enable quicker searching. In other words, in some embodiments, a document type identification dataset includes only a portion of the element data associated with a given type of document so that the dataset can be searched more quickly. Once the document type is identified, a full set of reference data associated with the identified type of document can be used to determine whether the scanned document is counterfeit, as discussed further below.

Returning to the dataset 600 shown in FIG. 6 to illustrate step 506, according to some embodiments, the intersection between elements 1 and 2 may be used to identify the document type. The reference database may be searched for two elements that intersect at an x-dimension of 2.1 and a y-dimension of 0.4. If this pattern is located in the reference database (or subset of the database used for document type identification), then the document type associated with the located data is identified as the type of the scanned document. This illustrates that only a portion of the data generated from the scanned document needs to be used to identify the type of document, according to some embodiments.

Identification step 506 results in the identification of the document type 508. Examples of document types 508 illustrated in FIG. 5 include event tickets, identity documents, stamp, bank notes, passports, and brand protections. These document types are merely illustrative and are non-exhaustive. Types may include sub-types within the broader types illustrated in FIG. 5, including, for example, different denominations of bank notes, different types of stamps, and different sources of identity documents and passports. Various embodiments may be configured for identifying one or more of any of these types of documents (or other types of documents not specifically mentioned).

At step 510, some or all of the element data generated during the analysis of the scanned image in step 504 is compared to some or all of the data in the reference (baseline) database that is associated with the document type 508 identified in step 506 to determine whether the document that was scanned is a counterfeit or is authentic. For example, returning to the dataset illustrates in FIG. 6, the measurements for the elements in dataset 600 may be compared to the associated data in a reference database and any discrepancies may indicate a counterfeit document. So, for element 1, the data in the reference database that is associated with a start x-dimension of 2.1 and a start y-dimension of 0.4 is queried and the length and thickness of element 1 is compared to the queried length and thickness. A discrepancy in one or both of these measurements may indicate a counterfeit document.

The analysis in step 510 may be performed until a discrepancy is found or may be performed for all of the elements represented in the dataset generated from the scanned image. In some embodiments, the determination that a document is counterfeit may be made when any measurement is different from the associated reference data. For example, in dataset 600 of FIG. 6, if the thickness of the reference element associated with element 1 (e.g., starting at 2.1/0.4 and of length 6.2) in the dataset 600 is 0.11 (i.e., 0.01 greater than the measurement in dataset 600), then the document is determined to be counterfeit. In some embodiments, a measurement tolerance is used to determine whether one or more measurements is off such that a determination of counterfeit is not made unless the discrepancy between scanned image data and reference data is outside of the tolerance window (e.g., +/−0.01 for the thickness measurement). In some embodiments, an overall accuracy threshold is used, for example, to reduce the number of false positives. For example, a determination that a document is counterfeit is made when a discrepancy is found in a certain percentage of the elements in the scanned image.

Different thresholds may be used for different types of documents based, for example, on the repeatability of the printing method used to generate authentic documents. For example, bank notes may have more accurate printing than event tickets, and therefore, the thresholds associated with bank notes may be relatively tighter than the thresholds associated with event tickets. Thresholds may also be set based on a balance between avoiding false positives and false negatives. For example, thresholds may be relatively tighter for passports than for event tickets since the risks associated with permitting entry of a person passing a counterfeit passport may be much greater than the risks associating with permitting entry of a person using a counterfeit ticket to an event.

In some embodiments, comparison of data extracted from a scanned image of a document and reference data may include one or more scaling or normalization steps that adjust data to account for variations in the scanning of the document. In some embodiments, the values of measurements generated from a scanned image are adjusted according to one or more parameters associated with the scanning procedure, and in other embodiments, the values of the reference data are adjusted according to one or more parameters associated with the scanning procedure. Adjustments can account for differences between the physical configurations of a counterfeit detection scanner relative to a scanner used to build the reference database and can account for variability introduced by the positioning of the document in the scanner, which can vary from one scan to the next.

Figure 7:
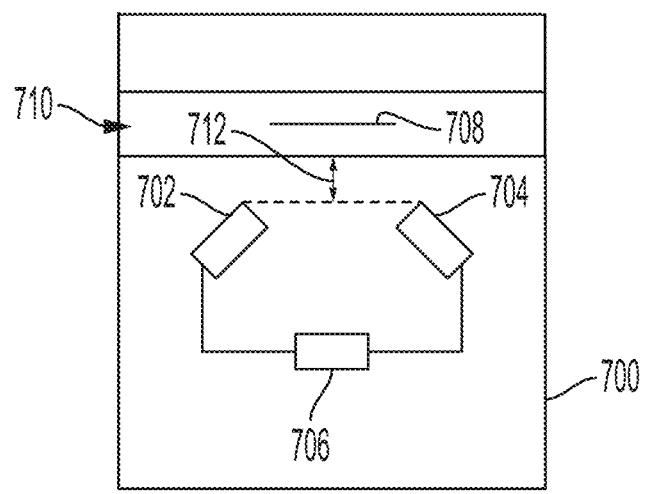
FIG. 7 illustrates sources of scanning variability that can be accounted for during counterfeit detection, according to some embodiments.

FIG. 7 illustrates an example of a variable that may be used to adjust a dataset prior to comparing scanned data to reference data. FIG. 7 includes a cross section of a scanner 700, such as scanner 402 of FIG. 4. Scanner 700 includes a lighting source 702, an imager 704, and a processor 706 for controlling the lighting source 702 and imager 704 for generating scanned images of a document 708 that is placed in the scanning port 710. The position 712 of the imager 704 relative to the scanning port 710 may vary from one scanner to the next and this variability may affect how elements in the document are captured in scanned images generated by different scanners (i.e., their size, shape, location, etc.). The position 712 of the imager 704 relative to the scanning port 710 can be measured (such as at the manufacturing facility) and the measurement can be used as a calibration parameter for adjusting data during counterfeit detection. In some embodiments, the calibration parameter can be provided by the scanner along with each scanned image so that the image analysis system (e.g., server 404 of FIG. 4) can make data adjustments using the calibration parameter. In other embodiments, calibration parameters for different scanners may be stored in a database and a calibration parameter for a given scanner may be retrieved from the database based on receiving a scanned image from the scanner.

Parameters associated with scanning variability (such as position 712) can be used to adjust (i.e., scale, offset, etc.) data generated from a scanned image prior to comparing the data to the reference data or can be used to adjust the reference data prior to comparing with the scanned image data. Variability parameters associated with a scanned image can be compared to variability parameters associated with the reference data to determine how much data should be adjusted. For example, where reference data is generated via a scanner having a position 712 of 5.0 and scanned image is generated by a scanner having a position 712 of 5.1, then either the data generated from the scanned image or the reference data can be scaled based on a delta of 0.1 between the relative positions 712.

Returning to FIG. 5, once a counterfeit/authentic determination 512 is made, an associated alert is generated. In some embodiments, in accordance with a determination that a document is authentic 514, a corresponding alert is generated at step 516. This can include, for example, a counterfeit detection server, such as server 404 of system 400, sending a signal to the scanner, such as scanner 402, so that the scanner can provide an indication that the document that was scanned has been determined to be authentic. This can include, for example, illuminating a green light, providing a message on a LCD screen, providing an audible signal, and/or providing any other suitable notification.

In some embodiments, if a document is determined to be counterfeit 518, a counterfeit alert can be provided at step 520. This can include the counterfeit determination server providing a signal to a scanner that, in turn, provides an indication to the user that the document that was scanned is counterfeit. The scanner can, for example, illuminate a red light, provide a message on a display screen, activate a buzzer, and/or provide any other suitable notification.

In some embodiments, a determination that a document is counterfeit may result in a visual screening of the scanned image at step 522. The scanned image or at least a portion of the scanned image may be displayed so that a user can visually inspect the scanned image to verify whether the scanned document is counterfeit. In some embodiments, the scanned image may be displayed at a display that is remote from the scanner, such as in a central security office. In other embodiments, the scanned image may be displayed at or near the scanner for visualization by the user that scanned the document.

In some embodiments, the portion or portions of the scanned image that included the elements that triggered the determination that the document is counterfeit are indicated to the user at step 522. For example, the portion of the scanned image having one or more irregularities relative to the reference data may be enlarged on the display screen or may be outlined or highlighted. In some embodiments, the corresponding portion of a reference document of the same type may be displayed side-by-side with the scanned image to enable a viewer to compare the scanned image to a reference image. In some embodiments, the data triggering a counterfeit determination may be displayed to the user. For example, the measurements associated with an element that differed from the reference data may be displayed along with the reference data so that a user can understand how different the scanned image measurements are from the reference data.

After the visual screening is complete, the screener may take any suitable action. For example, if the screener agrees that the scanned image indicates a counterfeit document, the screener can alert the user that scanned the document to refuse acceptance of the document or can begin surveilling the person that passed the counterfeit document. If the screener disagrees with the determination that the document is counterfeit, the screener can notify the user that scanned the document that the document is authentic.

In some embodiments, a determination that a document is counterfeit can result in a comparison, at step 524, between the element data generated from the scanned image and reference data of known counterfeit document types to determine the likely source of the counterfeit document. A known counterfeit document reference database may include element data generated from scans of known counterfeit documents. The data can be associated with sources of the known counterfeit documents. The scanned image element data can be compared to the data in the reference database to determine the source of the counterfeit document. a similarity between the scanned image element data and a set of reference element data can indicate that the source of the set of reference element data is the source for the document that was scanned.

In some embodiments, a positive comparison between the scanned image element data and a set of reference data in the known counterfeit document reference database may result in an alert indicating a match to a known counterfeit source at step 526. This alert may be provided, for example, to a law enforcement agency.

In some embodiments, the scanned image, a portion of the scanned image, and/or element data can be saved to a scanned image storage database at step 528. This can be useful for enabling later analysis of scanned images and/or element data for law enforcement or system improvement. In some embodiments, the scanned image or a portion of the scanned image may be displayed at the scanner and/or at a display remote from the scanner (such as in a central security office) at step 530.

Figure 8:
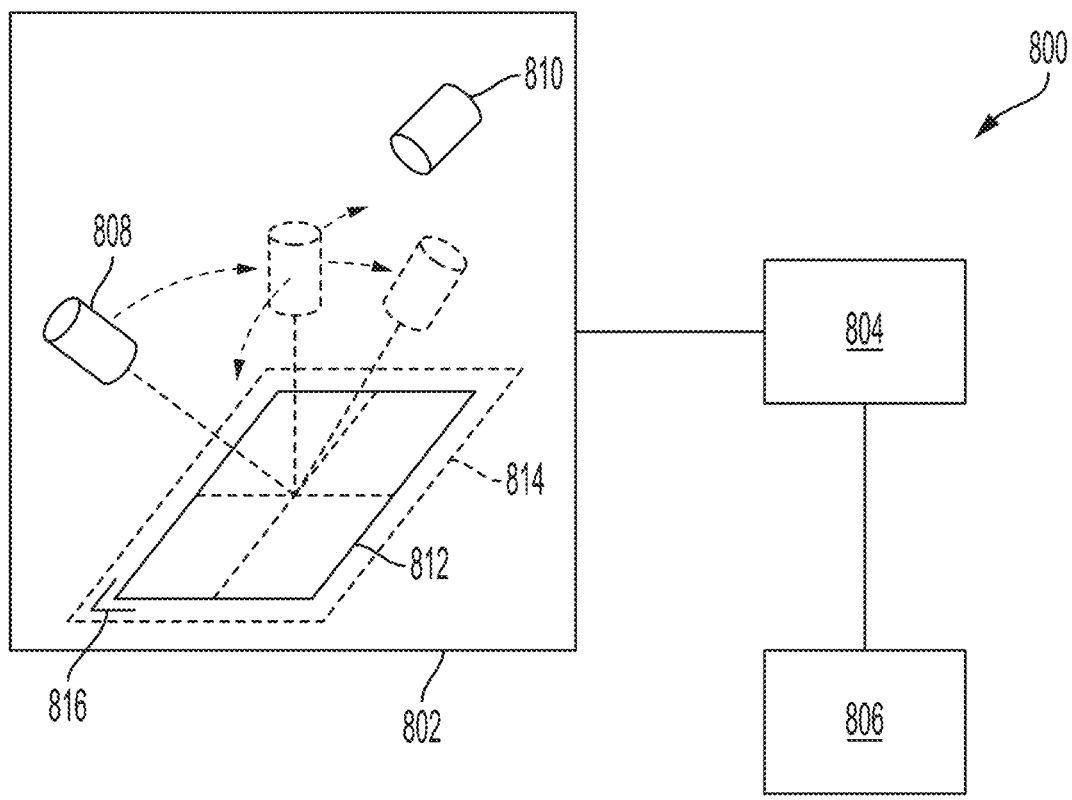
FIG. 8 is a functional block diagram of a system for collecting reference data for authentic document types, according to some embodiments.

FIG. 8 is a functional block diagram of a system 800 for collecting reference data from authentic document types, according to some embodiments. The reference data collected by system 800 can be used to compare data from scanned documents to determine whether the scanned documents are counterfeit, as discussed above with respect to method 500 of FIG. 5. System 800 includes a scanner 802 for scanning authentic documents, an element extractor 804 for identifying elements in the scanned image and generating measurements of characteristics of those elements, and a reference database 806 for storing the element data.

The scanner 802 may be the same type of scanner used for detecting counterfeit documents (such as scanner 402 of FIG. 4), or may be a different scanner used specifically for building the reference database. The scanner 802 includes at least one light source 808 for illuminating a document and at least one imager 810 for capturing a scanned image of the document. An authentic document 812 may be placed on a scanning surface 814 for scanning. In some embodiments, the document 812 is aligned with an alignment mark 816 on the scanning surface 814 to ensure accurate scanning. Once the document 812 is positioned on the scanning surface 814, the document 812 is illuminated by the at least one light source 808 and light reflected from the document is captured by the at least one imager and a scanned image is generated.

The scanner 802 provides the scanned image to the element extractor 804, which may be a component of a scanning system that includes scanner 802 or can be a separate processing system that is communicatively connected to scanner 802. The element extractor 804 analyzes the scanned image and identifies elements in the scanned image in accordance with the principles discussed above. Characteristics of the identified elements, such as position, length, thickness, and spacing from other elements and/or reference points, are measured and the measurements are stored in the reference database 806.

In some embodiments, the system 800 is configured to scan authentic documents with varying lighting angles and/or varying imaging angles and generate measurements for each of the lighting/imaging conditions. The varying lighting/imaging conditions can simulate the various ways in which a document may be scanned at a counterfeit detection scanner. This may be particularly advantageous for embodiments in which a contactless scanner is used for counterfeit detection because, with contactless scanning, documents generally are not placed in precisely the same position and/or precisely the same orientation each time and may be moving through the scanner when the scanned image is generated. Further, varying the lighting and/or imaging orientation can be important for documents that include intaglio printing. Since intaglio printing results in raised elements, oblique lighting may cause shadowing that skews the appearance of the elements in a scan. By varying the position of the lighting, the shadowing effects can be observed and accounted for.

In some embodiments, multiple scans of each authentic document are generated with the at least one light source 808 and/or the at least one imager 810 being repositioned between each scan. In some embodiments, the at least one light source 808 and/or at least one imager 810 may be positioned at different angles relative to the surface of the document for each scan. In some embodiments, the at least one light source 808 and/or the at least one imager 810 are moved to different angular positions relative to the document in an x-z plane and in a y-z plane.

Characteristics may be identified and measured for each lighting/imaging condition. In some embodiments, the resulting reference data for each lighting/imaging condition is stored as reference data for use in counterfeit detection. Thus, potential counterfeit scanned image element data is compared against each set of reference data for the same document type. In other embodiments, the data generated for the different lighting/imaging conditions is analyzed together to generate a set of reference data and tolerances. For example, if the range of lighting/imaging conditions results in element x having a thickness of between 0.10 and 0.12, then the reference data stored in the reference database 806 may have an element x thickness of 0.15+/−0.05 and a corresponding element in a scanned image that falls within that range would be deemed acceptable and not indicative of a counterfeit.

System 800 can scan and analyze authentic versions of multiple types of documents and store the data in reference database 806 for use during document counterfeit detection. For example, reference database 806 can be built for currency and can include data for the front and bank sides of various denominations and printing years of currency and country of issuance.

Figure 9:
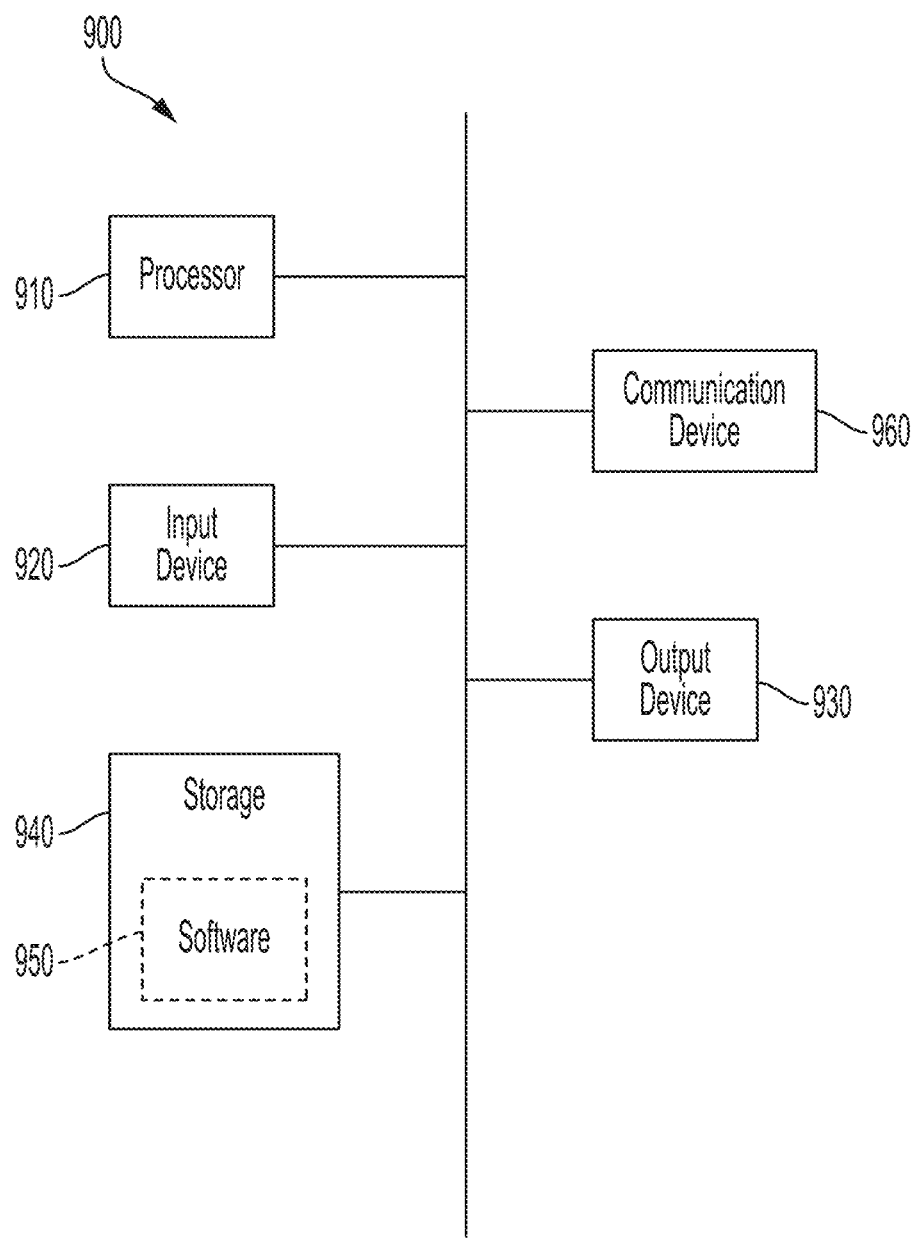
FIG. 9 illustrates a computing device, according to some embodiments.

FIG. 9 illustrates an example of a computing device in accordance with one embodiment. Computing device 900 can be a component of a system for detecting counterfeit documents, such scanner 402 or server 404 of system 400 of FIG. 4. In some embodiments, computing device 900 is configured to perform one or more steps of a method for detecting counterfeit documents, such as method 500 of FIG. 5.

Computing device 900 can be a host computer connected to a network. Computing device 900 can be a client computer or a server. As shown in FIG. 9, computing device 900 can be any suitable type of microprocessor-based device, such as a personal computer, workstation, server, or handheld computing device, such as a smartphone, a tablet, or a smartwatch. The computer can include, for example, one or more of processor 910, input device 920, output device 930, storage 940, and communication device 960. Input device 920 and output device 930 can generally correspond to those described above and can either be connectable or integrated with the computer.

Input device 920 can be any suitable device that provides input, such as a touch screen or monitor, keyboard, mouse, or voice-recognition device. Output device 930 can be any suitable device that provides output, such as a touch screen, monitor, printer, disk drive, or speaker.

Storage 940 can be any suitable device that provides storage, such as an electrical, magnetic, or optical memory, including a RAM, cache, hard drive, CD-ROM drive, tape drive, or removable storage disk. Communication device 960 can include any suitable device capable of transmitting and receiving signals over a network, such as a network interface chip or card. The components of the computer can be connected in any suitable manner, such as via a physical bus or wirelessly. Storage 940 can be a non-transitory computer readable storage medium comprising one or more programs, which, when executed by one or more processors, such as processor 910, cause the one or more processors to perform methods described herein, such as method 500 of FIG. 5.

Software 950, which can be stored in storage 940 and executed by processor 910, can include, for example, the programming that embodies the functionality of the present disclosure (e.g., as embodied in the systems, computers, servers, and/or devices as described above). In some embodiments, software 950 can include a combination of servers such as application servers and database servers.

Software 950 can also be stored and/or transported within any computer-readable storage medium for use by or in connection with an instruction execution system, apparatus, or device, such as those described above, that can fetch instructions associated with the software from the instruction execution system, apparatus, or device and execute the instructions. In the context of this disclosure, a computer-readable storage medium can be any medium, such as storage 940, that can contain or store programming for use by or in connection with an instruction execution system, apparatus, or device.

Software 950 can also be propagated within any transport medium for use by or in connection with an instruction execution system, apparatus, or device, such as those described above, that can fetch instructions associated with the software from the instruction execution system, apparatus, or device and execute the instructions. In the context of this disclosure, a transport medium can be any medium that can communicate, propagate, or transport programming for use by or in connection with an instruction execution system, apparatus, or device. The transport readable medium can include, but is not limited to, an electronic, magnetic, optical, electromagnetic, or infrared wired or wireless propagation medium.

Computing device 900 may be connected to a network, which can be any suitable type of interconnected communication system. The network can implement any suitable communications protocol and can be secured by any suitable security protocol. The network can comprise network links of any suitable arrangement that can implement the transmission and reception of network signals, such as wireless network connections, T1 or T3 lines, cable networks, DSL, or telephone lines.

Computing device 900 can implement any operating system suitable for operating on the network. Software 950 can be written in any suitable programming language, such as C, C++, Java, or Python. In various embodiments, application software embodying the functionality of the present disclosure can be deployed in different configurations, such as in a client/server arrangement or through a Web browser as a Web-based application or Web service, for example.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying figures, it is to be noted that various changes and modifications will become apparent to those skilled in the art. Such changes and modifications are to be understood as being included within the scope of the disclosure and examples as defined by the claims. Finally, the entire disclosure of the patents and publications referred to in this application are hereby incorporated herein by reference.

The invention claimed is:

1. A method of detecting a counterfeit item using a contactless scanner, the method comprising:
   contactlessly scanning at least a portion of an item to generate a scanned image of the at least a portion of the item, wherein the at least a portion of the item comprises a visible graphic that comprises a plurality of human visible lines,
   identifying at least a portion of the plurality of lines in the scanned image;
   determining a first characteristic of at least one line of the plurality of lines;
   identifying a type of the item based on the first characteristic of the at least one line;
   determining at least a second characteristic of the at least one line, the at least a second characteristic being different than the first characteristic and comprising line thickness and/or spacing of the at least one line, to generate at least one line thickness and/or spacing measurement;
   determining whether the item is counterfeit based on a comparison between the at least one line thickness and/or spacing measurement and at least one reference line thickness and/or spacing measurement that is associated with an authentic version of the item; and
   in response to determining that the item is counterfeit, generating an alert indicating a detection of a counterfeit item.

2. The method of claim 1, wherein contactlessly scanning the item comprises passing the item into and out of the contactless scanner by hand.

3. The method of claim 2, wherein the item is moved while being scanned.

4. The method of claim 1, wherein the scanned image is transmitted from the contactless scanner to a server for determination of whether the item is counterfeit.

5. The method of claim 4, wherein the contactless scanner generates the alert.

6. The method of claim 1, wherein the plurality of line thickness and/or spacing measurements comprises line width and spacing between lines.

7. The method of claim 1, wherein the first characteristic comprises a location of an intersection of a first line with a second line relative to an edge of the item in the scanned image, wherein the plurality of thickness and/or spacing measurements comprises at least one of a width of the first line and a distance between the first line and a third line, and wherein determining whether the item is counterfeit comprises:
- locating reference thickness and/or spacing measurements that correspond to the first line in a database of reference thickness and/or spacing measurements of the authentic version of the item based on the location of the intersection of the first line with the second line; and
- comparing the at least one of a width of the first line and a distance between the first line and a third line to the reference thickness and/or spacing measurements that correspond to the first line.

8. The method of claim 1, further comprising, in response to determining that the item is counterfeit, comparing at least a portion of the plurality of line thickness and/or spacing measurements to line thickness and/or spacing measurements in a database of known counterfeit items to identify a source of the item.

9. The method of claim 1, wherein the item is a bank note.

10. The method of claim 1, wherein the item is an event ticket, an identity document, or a stamp.

11. The method of claim 1, wherein the first characteristic of the at least one line of the plurality of lines comprises a location of an intersection of a first line with a second line.

12. A system for detecting a counterfeit item, comprising:
- a contactless scanner for contactlessly scanning at least a portion of an item to generate a scanned image of the at least a portion of the item, wherein the at least a portion of the item comprises a visible graphic that comprises a plurality of human visible lines; and
- at least one processor, memory, and one or more programs stored in the memory for execution by the at least one processor, the one or more programs comprising instructions for:
  - identifying at least a portion of the plurality of lines in the scanned image,
  - determining a first characteristic of at least one line of the plurality of lines;
  - identifying a type of the item based on the first characteristic of the at least one line;
  - determining at least a second characteristic of the at least one line, the at least a second characteristic being different than the first characteristic and comprising line thickness and/or spacing of the at least one line, to generate at least one line thickness and/or spacing measurement, and
  - determining whether the item is counterfeit based on a comparison between the at least one line thickness and/or spacing measurement and at least one reference line thickness and/or spacing measurement that is associated with an authentic version of the item,
- wherein the system is configured to generate an alert indicating a detection of a counterfeit item in response to determining that the item is counterfeit.

13. The system of claim 12, wherein the contactless scanner and the at least one processor are connected over a network.

14. The system of claim 12, wherein the contactless scanner comprises an indicator for providing the alert indicating the detection of a counterfeit item.

15. The system of claim 12, wherein the contactless scanner is configured to contactlessly scan the item while the item is passed into and out of the contactless scanner by hand.

16. The system of claim 15, wherein the contactless scanner is configured to contactlessly scan the item while the item is moving.

17. The system of claim 12, wherein the contactless scanner is configured to transmit the scanned image to a server that comprises the at least one processor for determination of whether the item is counterfeit.

18. The system of claim 17, wherein the contactless scanner is configured to generate the alert.

19. The system of claim 12, wherein the plurality of line thickness and/or spacing measurements comprises line width and spacing between lines.

20. The system of claim 12, wherein the first characteristic comprises a location of an intersection of a first line with a second line relative to an edge of the item in the scanned image, wherein the plurality of thickness and/or spacing measurements comprises at least one of a width of the first line and a distance between the first line and a third line, and wherein determining whether the item is counterfeit comprises:
- locating reference thickness and/or spacing measurements that correspond to the first line in a database of reference measurements of the authentic version of the item based on the location of the intersection of the first line with the second line; and
- comparing the at least one of a width of the first line and the distance between the first line and a third line to the reference thickness and/or spacing measurements that correspond to the first line.

21. The system of claim 12, wherein one or more programs comprise instructions for, in response to determining that the item is counterfeit, comparing at least a portion of the plurality of line thickness and/or spacing measurements to line thickness and/or spacing measurements in a database of known counterfeit items to identify a source of the item.

22. The system of claim 12, wherein the item is a bank note.

23. The system of claim 12, wherein the item is an event ticket, an identity document, or a stamp.

* * * * *